(No Model.)
L. DE CAILLY.
BUGGY SHAFTS.
No. 506,211.      Patented Oct. 10, 1893.
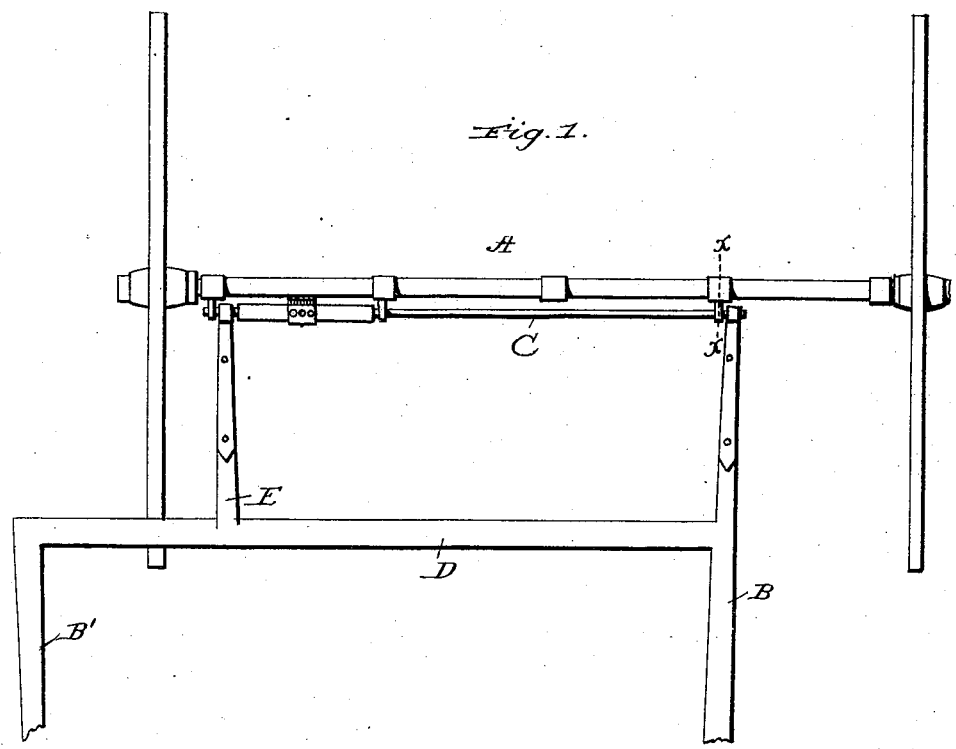
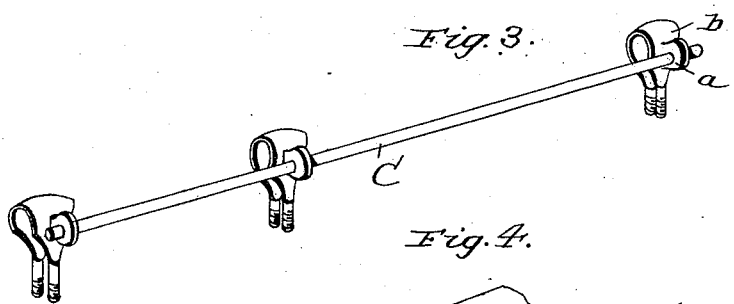
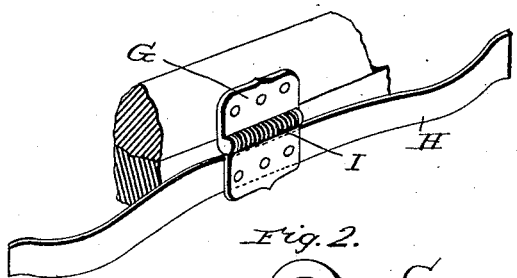
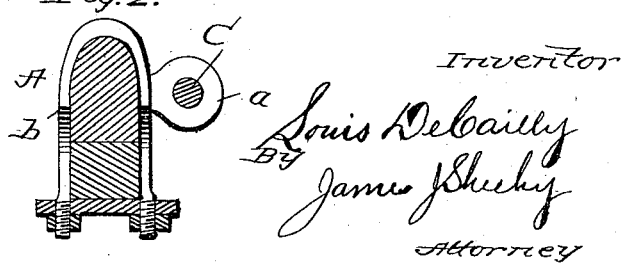
Witnesses:
C. H. Jarder
T. E. Turpin
Inventor
Louis DeCailly
By James J Sheehy
Attorney

UNITED STATES PATENT OFFICE.

LOUIS DE CAILLY, OF FORT MADISON, IOWA.

BUGGY-SHAFTS.

SPECIFICATION forming part of Letters Patent No. 506,211, dated October 10, 1893.

Application filed December 17, 1892. Serial No. 455,452. (No model.)

*To all whom it may concern:*

Be it known that I, LOUIS DE CAILLY, a citizen of the United States, residing at Fort Madison, in the county of Lee and State of Iowa, have invented certain new and useful Improvements in Movable and Sliding Buggy-Shafts; and I do declare the following to be a full, clear, and exact description of the invention, such as will enable others skilled in the art to which it appertains to make and use the same.

My invention relates to improvements in means for coupling thills or shafts to vehicles, and it has for its general object to so connect a pair of thills to a vehicle that they may be adjusted laterally and adjustably fixed so that the draft animal may travel in the same track as the vehicle or in a path lateral to the path of the vehicle, as is most desirable.

A further object of the invention is to provide a pair of thills or shafts, so constructed that they may be adjusted laterally without interfering with the wheels of the vehicle.

Other objects and advantages of the invention will be fully understood from the following description and claims when taken in connection with the annexed drawings in which—

Figure 1, is a front view illustrating my improved coupling in an operative position, the shafts being illustrated in their laterally adjusted positions. Fig. 2, is a detail transverse section taken in the plane indicated by the line x, x, of Fig. 1. Fig. 3, is a perspective view of the slide rod and the clips removed from the vehicle axle, and Fig. 4, is a detail perspective view illustrating the position of the pressure device when the slide rod is removed.

Referring by letter to said drawings:—A, indicates a vehicle which may be of any ordinary or approved construction and B, B', indicate my improved shafts or thills. The shaft or thill B, as illustrated in Fig. 1, is connected directly to the slide rod C, of the coupling and the shaft B', which is shorter than the shaft B, is connected to said shaft B, by a transverse bar D, which in turn is connected to the slide rod C, by a short angularly disposed bar E, arranged at an intermediate point of the length of said bar D, as shown. By this construction it will be readily perceived that the shafts may be shifted toward the right without engaging or interfering with the wheels, which is an important advantage, as is obvious.

The shaft B, and the bar E, are fixedly connected to the slidable rod C, as before described and the said bar is carried by the clips b, which are secured upon the axle in any approved manner.

In order to fix the rod C, and the thills or shafts in their adjusted positions, I have provided the pressure device F, (better shown in Fig. 4,) which comprises the hinge G, one member of which is connected to the vehicle axle, the bar or plate H, which is connected to or formed integral with the free member of the hinge, and the spring I, which is mounted on the pintle of the hinge and is designed and adapted to exert a pressure upon the outer or free member thereof so as to press the bar or plate H, against the rod C, and hold the same by frictional contact. Thus it will be seen that the bar may be fixed in the longitudinal center of the vehicle or in positions upon either side of the same; and it will also be seen that it is simply necessary, in order to shift the bar C, to move the bar or plate H, out of engagement with the same.

It will be readily noted from the foregoing description and the drawings, that my improved coupling is very simple, durable and compact; that it does not add materially to the weight of a vehicle nor detract from the appearance thereof, and that it may be readily operated by hand, without the employment of tools, which is an important desideratum.

Having described my invention, what I claim is—

1. The shafts or thills, comprising the shaft B, the shaft B', of a less length than the shaft B, the transverse bar D, connected to the inner end of the shaft B', and also connected to the shaft B, at an intermediate point in the length thereof, in combination with the slidable rod, bearings for said rod adapted to be connected to a vehicle axle, and a pressure device adapted to adjustably fix the rod and comprising a hinge, one member of which is adapted to be connected to the vehicle axle, a bar or plate connected to the free member of the hinge, and a spring adapted to exert a pressure upon the free member of the said hinge, so as to hold the latter against the slidable rod, substantially as and for the purposes specified.

2. In a thill coupling, the combination of a slidable rod, bearings for said rod adapted to be connected to a vehicle axle, and a pressure device adapted to adjustably fix the rod and comprising a hinge, one member of which is adapted to be connected to the vehicle axle, a bar or plate connected to the free member of the hinge and a spring adapted to exert a pressure upon the free member of the hinge and the bar or plate so as to hold the latter against the slidable rod, substantially as and for the purpose set forth.

LOUIS DE CAILLY.

Witnesses:
JOHN SCHROEDER,
C. J. MONTANDOR.